United States Patent

[11] 3,532,117

| | | |
|---|---|---|
| [72] | Inventor | Francis R. Racki<br>Pittsburgh, Pennsylvania |
| [21] | Appl. No. | 756,937 |
| [22] | Filed | Sept. 3, 1968 |
| [45] | Patented | Oct. 6, 1970 |
| [73] | Assignee | Westinghouse Air Brake Company<br>Wilmerding, Pennsylvania<br>a corporation of Pennsylvania |

[54] BRAKE CYLINDER PRESSURE RETAINING VALVE
13 Claims, 13 Drawing Figs.

[52] U.S. Cl. .................................................. 137/550;
303/75, 303/79, 251/309, 137/625.24
[51] Int. Cl. ..................................................... F16k 11/06,
F16k 5/02
[50] Field of Search .......................................... 303/75—79,
251/309—311; 137/550, 381, 382, 383,
625.21—.24, 596.12, 12, 377

[56] References Cited
UNITED STATES PATENTS
1,026,311 5/1912 Hammond .................. 303/79
2,024,685 12/1935 Farmer ........................ 303/79
3,324,769 6/1967 Mansell ...................... 137/625.24X

*Primary Examiner*—Henry T. Klinksiek
*Attorneys*—Adelbert A. Steinmiller and Ralph W. McIntire, Jr.

ABSTRACT: A three-position sealed key-type pressure retaining valve device, for connection to the exhaust passageway of a railway car brake control valve device, having a body provided with a tapered bore in which a plug-type valve element having a handle is rotatable selectively to any one of its three positions. The plug-type valve element has a longitudinal passageway at one end of which is a valve seat against which normally rests a spring-biased check valve, which in one position of the valve element is opened to provide a slow blow down of brake cylinder pressure to a chosen pressure above atmospheric pressure. The wall of the valve element is further provided with a pair of angularly spaced orifices of different cross-sectional areas communicating the longitudinal passageway to the exterior of the valve element, which orifices are effective upon rotation of the valve element to the respective other two of its positions to selectively provide either a fast or a slow blow down of brake cylinder pressure to atmosphere.

Patented Oct. 6, 1970
3,532,117
Sheet 1 of 3
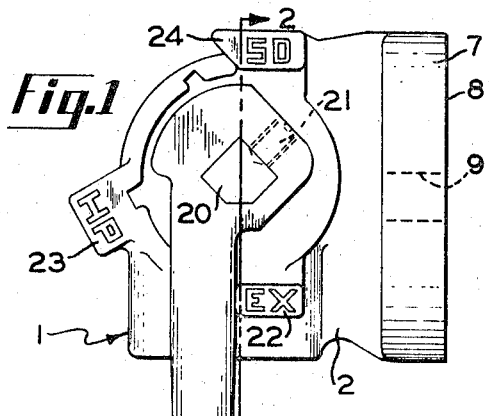
Fig.1
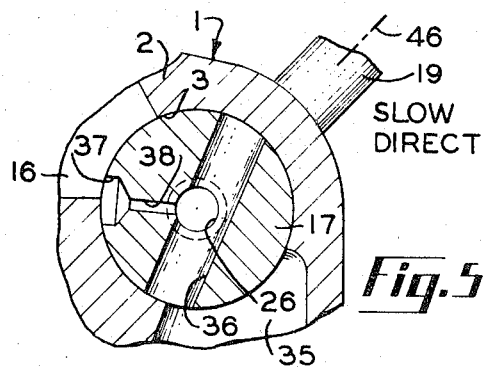
Fig.5
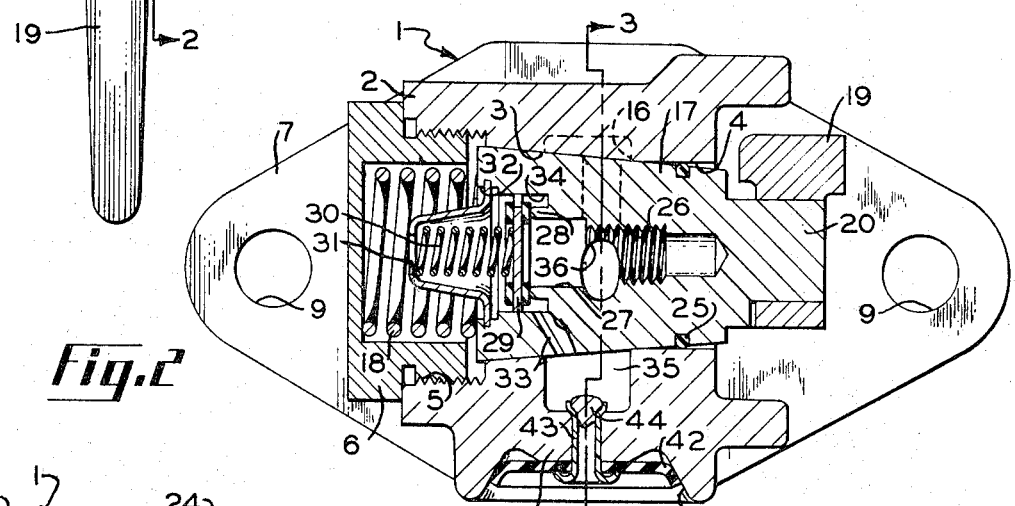
Fig.2
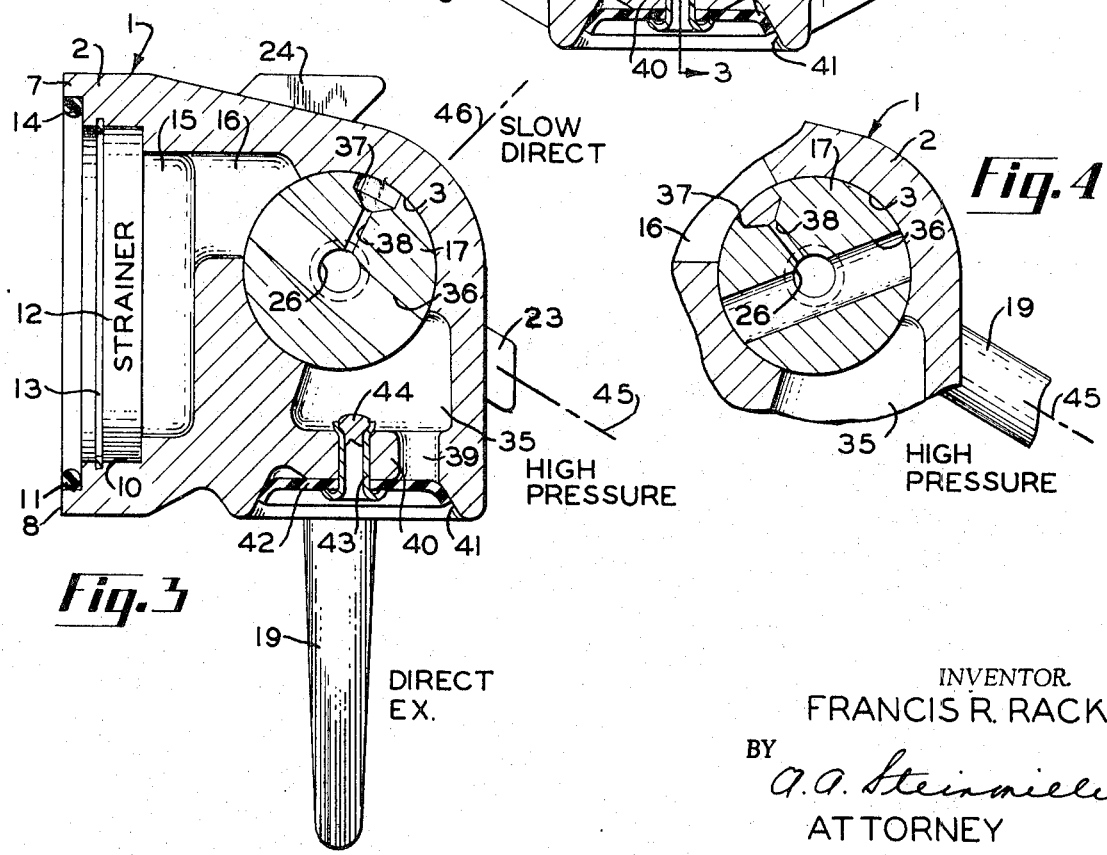
Fig.3
Fig.4
INVENTOR.
FRANCIS R. RACKI
BY
A. A. Steinmiller
ATTORNEY

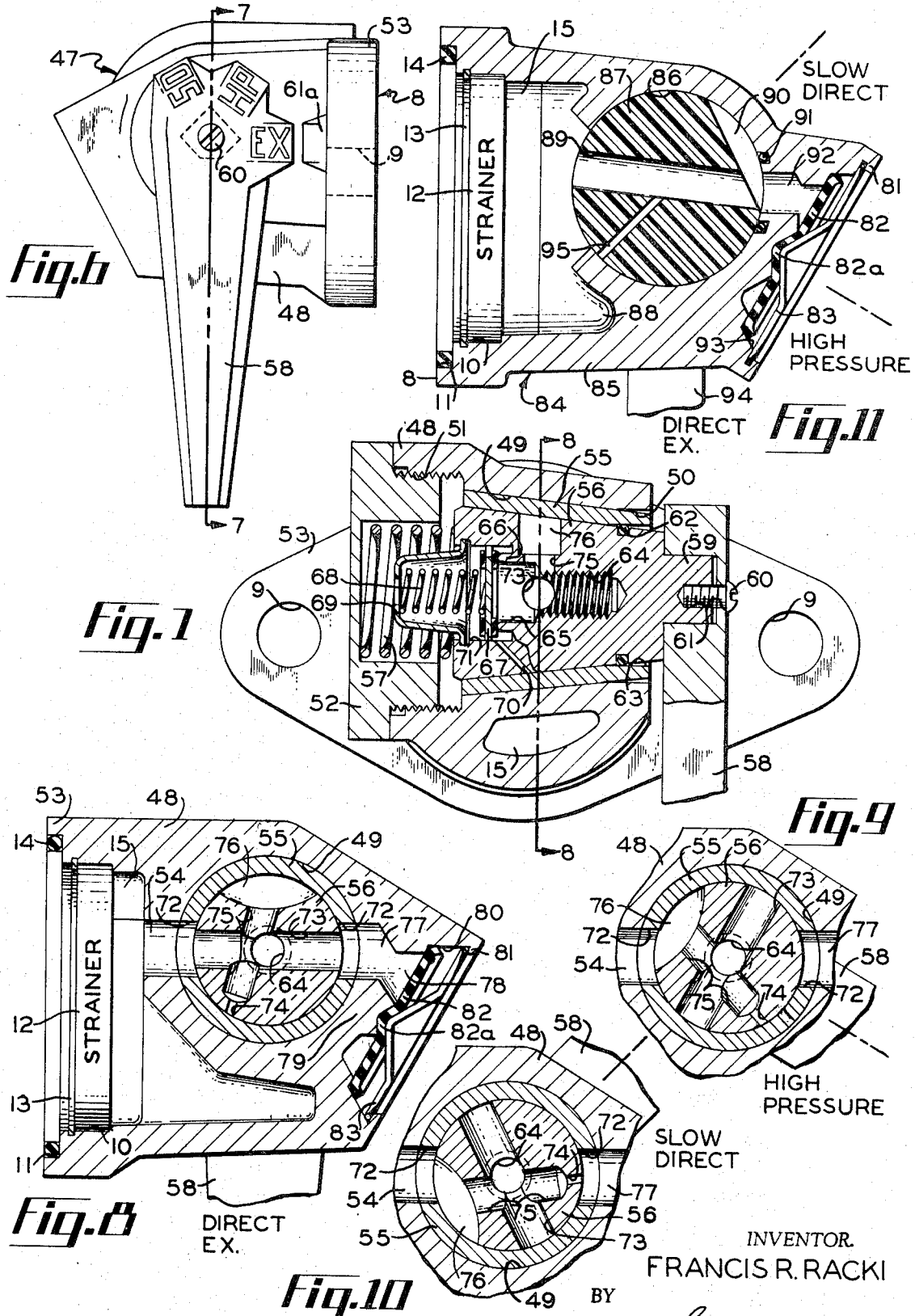

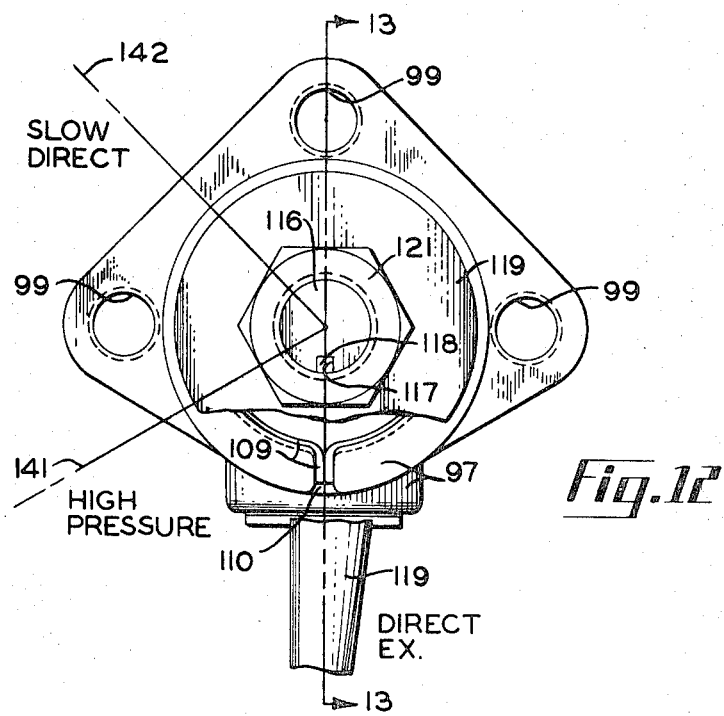
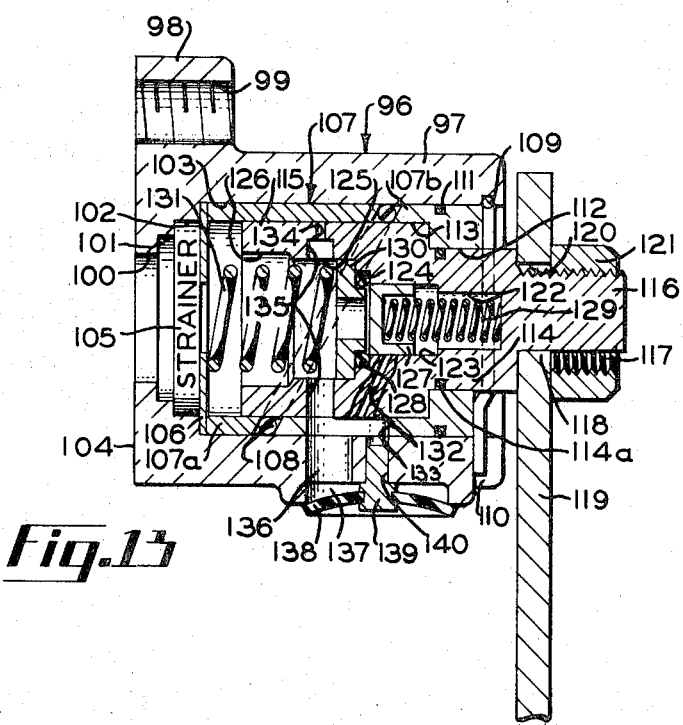
INVENTOR.
FRANCIS R RACKI

BRAKE CYLINDER PRESSURE RETAINING VALVE

BACKGROUND OF THE INVENTION

For many years past, the railroads have commonly and widely used a brake cylinder pressure retainer of the type shown in U.S. Pat. No. 2,204,796 issued June 18, 1940, to Clyde C. Farmer, and assigned to the assignee of the present application. The retainer shown and described in the patent is a four-position brake cylinder pressure retaining valve device comprising a pair of spring weighted check valves and a rotary valve operable, according to the positioning of a handle, to divert the flow of air discharged from a brake cylinder device past one or both check valves to the atmosphere, or through an unrestricted or a restricted passageway to atmosphere. The two check valves provided for retaining in the brake cylinder device, where so desired, either a certain high pressure or a lower pressure that is substantially half the value of this certain high pressure.

American railroads today do not use that position of retaining valve devices which provides for retaining the above-mentioned lower pressure in brake cylinder devices since this lower pressure is merely enough to maintain the brake shoes in contact with the tread surface of the corresponding wheel and produces little or no retarding force on these wheels. Therefore, from the point of view of the American railroads, a less expensive retaining valve device capable of providing only a single retaining pressure and, therefore, requiring less maintenance would be most desirable.

Accordingly, it is the general purpose of this invention to provide an improved, novel, compact, and simple three-positioned brake cylinder pressure retaining valve device that is inexpensive from both an initial and maintenance cost standpoint. "Type Three-Position Retaining Valve for Freight Brake Equipment" as set forth by the Association of American Railroads in their Circular No. D.V.-1651. dated May 26, 1967.

SUMMARY OF THE INVENTION

According to the present invention, a novel three-position brake cylinder pressure retaining valve device is provided comprising essentially a valve body having a tapered bore within which a removable correspondingly tapered sealed plug-type valve or key is manually rotatable by a handle secured to the smaller end of the key. The key has a longitudinal stepped bore or passageway at the larger inner end in which is formed a valve seat against which a check valve disposed within the key is normally biased. The cooperation of the key and the check valve with the body of the valve device as the key is manually rotated therein to a plurality of corresponding positions selectively provides a fast blowdown of brake cylinder pressure to atmospheric pressure, a slow blowdown of brake cylinder pressure to a chosen pressure above atmospheric pressure, and a slow direct blowdown of brake cylinder pressure to atmospheric pressure.

In the accompanying drawings:

FIG. 1 is a front elevational view showing a three-position brake cylinder pressure retaining valve device constructed in accordance with one embodiment of the invention.

FIG. 2 is a vertical cross-sectional view, at an enlarged scale, taken along the line 2-2 of FIG. 1 and looking in the direction of the arrows, showing certain structural details of this valve device.

FIG. 3 is a vertical cross-sectional view, taken along the line 3-3 of FIG. 2 and looking in the direction of the arrows, showing further structural details of the three-position brake cylinder pressure retaining valve device not made apparent in FIG. 2, a key of this brake cylinder pressure retaining valve device occupying its first position in which an unrestricted and direct communication is established between a brake cylinder device and atmosphere.

FIG. 4 is a partial vertical cross-sectional view of the three-position brake cylinder pressure retaining valve device of FIG. 3 with the key shown in the second of its three positions in which a chosen pressure is retained in a brake cylinder device.

FIG. 5 is a partial vertical cross-sectional view of the three-position brake cylinder pressure retaining valve device of FIG. 3 with the key shown in the third of its three positions in which a restricted communication is established between a brake cylinder device and atmosphere.

FIG. 6 is a front elevational view showing a three-position brake cylinder pressure retaining valve device constructed in accordance with a second embodiment of the invention.

FIG. 7 is a vertical cross-sectional view, at an enlarged scale, taken along the line 7-7 of FIG. 6 and looking in the direction of the arrows, showing certain structural details of this valve device.

FIG. 8 is a vertical cross-sectional view, taken along the line 8-8 of FIG. 7 and looking in the direction of the arrows, showing further structural details of the three-position brake cylinder pressure retaining valve device not made apparent in FIG. 7, a key of this brake cylinder pressure retaining valve occupying its first position in which an unrestricted and direct communication is established between a brake cylinder device and atmosphere.

FIG. 9 is a partial vertical cross-sectional view of the three-position brake cylinder pressure retaining valve device of FIG. 8 with the key shown in the second of its three positions in which a chosen pressure is retained in a brake cylinder device.

FIG. 10 is a partial vertical cross-sectional view of the three-position brake cylinder pressure retaining valve device of FIG. 8 with the key shown in the third of its three positions in which a restricted communication is established between a brake cylinder device and atmosphere.

FIG. 11 is a vertical cross-sectional view of a third embodiment of the invention embodying a three-position brake cylinder pressure retaining valve device that differs from the brake cylinder pressure retaining valve device shown in FIGS. 6 to 10, inclusive, in that the key is constructed of plastic which, in combination with a seal disposed about the exhaust port, eliminates the necessity for the bushing shown in FIGS. 7 to 10, inclusive.

FIG. 12 is a front elevational view showing a three-position brake cylinder pressure retaining valve device constructed in accordance with a fourth embodiment of the invention.

FIG. 13 is a vertical cross-sectional view, taken along the line 13-13 of FIG. 12 and looking in the direction of the arrows, showing certain structural details.

As shown in FIGS. 1 to 5, inclusive, a three-position brake cylinder pressure retaining valve device 1 constituting a first embodiment of the invention comprises a casing 2 having therein a tapered bore 3 which, as shown in FIG. 2, opens at its right-hand end into a straight smooth bore 4 and at its left-hand end into a screw-threaded bore 5 in which is received a screw-threaded plug 6.

As is apparent from FIGS. 1, 2 and 3, formed integrally with the casing 2 is a flange 7 having a flanged fitting face 8 that abuts a corresponding face formed on a pipe bracket (not shown) that is secured to the body of a railway car by any suitable means. This pipe bracket has connected thereto one end of a brake cylinder exhaust pipe (not shown) that has its opposite end connected to the exhaust port of the usual fluid pressure operated brake control valve device (not shown) which is provided on each car in a train. As shown in FIG. 2, the flange 7 is provided with two spaced-apart smooth bores 9 for receiving cap screws (not shown) to secure the flange 7 to the pipe bracket.

The above-mentioned one end of the brake cylinder exhaust pipe is disposed in a bore (not shown) in the pipe bracket which bore is coaxial with two coaxial counterbores 10 and 11 (FIG. 3) of unequal diameter formed in the casing 2. Disposed in the counterbore 10 is a strainer device 12 of any suitable construction which is retained against the right-hand end of the counterbore 10 by a snap ring 13 that is inserted in a groove formed in the wall surface of the counterbore 10.

Disposed in the counterbore 11 is an O-ring 14 which forms a seal between the flange fitting face 8 on the flange 7 and the abutting corresponding face formed on the pipe bracket when the retaining valve device 1 is secured to this pipe bracket by the above mentioned cap screws that secure this valve device 1 to the pipe bracket.

The counterbore 10 opens into a chamber 15 formed in the casing 2 and connected to the tapered bore 3 in this casing by a passageway 16 also formed in the casing.

As shown in FIG. 2, a tapered plug or key 17 is rotatably mounted in the tapered bore 3 in the casing 2. A spring 18 is interposed between the plug 6 and the left-hand end of the key 17 to bias this key 17 against the wall of the tapered bore 3 to provide sufficient friction therebetween to insure that the key 17 is not moved by car vibration from any one of three positions to which it may be manually moved by a handle 19 having a substantially square socket into which fits a substantially square shank 20 (FIG. 2) formed on the right-hand end of the key 17. A set screw 21 (FIG. 1) serves to secure the handle 19 to the shank 20.

As shown in FIG. 1 of the drawings, cast or stenciled on three arcuate spaced-apart lugs 22, 23 and 24 integral with the casing 2 are the indicia EX, HP and SD denoting corresponding exhaust, high pressure and slow direct positions of the key 17 accordingly as the handle 19 respectively abuts the left-hand side of lug 22, as shown in FIG. 1, overlies the lug 23, or abuts the left-hand end of the lug 24, the lugs 22 and 24 serving as limit stops for the handle 19 in that they extend from the top of casing 2 a distance greater than the plane of rotation of the handle 19 from the top of this casing.

As shown in FIG. 2, the tapered key 17 is provided adjacent the shank 20 with a peripheral annular groove in which is disposed an O-ring 25 that forms a seal with the wall surface of the straight bore 4 to prevent leakage of fluid under pressure from the passageway 16 to atmosphere along the periphery of the key 17.

This key 17, as also shown in FIG. 2, is provided with a screw-threaded bottom bore 26 the screw threads being provided to facilitate machining during manufacture of this key and are not necessary to the proper operation of the retaining valve device 1. The left-hand end of this bottom bore 26 opens into a coaxial counterbore 27 at the left-hand end of which is formed an annular valve seat 28 against which a flat disc-type check valve 29 is biased by a spring 30 interposed between this check valve 29 and a slotted cup-shaped spring seat 31 that has at its right-hand end an outturned flange which is inserted in a groove formed in the wall surface of a counterbore 32 extending inward from the left-hand end of the key 17 and coaxial with the counterbore 27 therein.

While the spring 30 biases the valve 29 against its seat 28, communication is closed between the counterbore 27 and a drilled passageway 33 of small diameter constituting a choke provided in the key 17. One end of this passageway 33 opens into a third counterbore 34 coaxial with the counterbores 27 and 32 and having a diameter intermediate the diameters of these counterbores. The opposite end of this passageway 33 opens at the peripheral surface of the key 17 at such a location as to open into a chamber 35 formed in the casing 2 while the key 17 occupies its high pressure position shown in FIG. 4.

The key 17 is further provided with a bore or port 36 of large diameter the axis of this bore being at a right angle to and slightly offset from the axis of the above-mentioned screw-threaded bottom bore 26 whereby fluid under pressure may flow from the chamber 15 to the right-hand side of the check valve 29 via passageway 16, bores 36 and 26, and counterbore 27 to effect unseating of this valve 29 against the yielding resistance of the spring 30 from the valve seat 28 in a manner hereinafter described in detail to provide, while the handle 19 and key 17 are in their high pressure position, for the blowdown of fluid under pressure from a brake cylinder device to a chosen high pressure which may be, for example, twenty pounds per square inch, which pressure is thereafter retained in the brake cylinder device.

In order to provide for a slow direct complete blowdown of fluid under pressure from the brake cylinder device, while the handle 19 is in its slow direct position in which the key 17 occupies the position shown in FIG. 5, this key 17 is provided with a counterbore 37 that has one end opening at the peripheral surface of the key and into the passageway 16. The opposite end of counterbore 37 registers with one end of a coaxial bore or port 38 of small diameter that at its opposite end opens into the large bore 36, the bore 38 thus constituting a choke between the counterbore 37 and the bore 36.

As best shown in FIG. 3 of the drawings, the chamber 35 in the casing 2 is open to atmosphere via a passageway 39 that extends through a wall 40 that has formed on its lower side a conical inner surface 41. Resting against this conical inner surface 41 is a dished circular shield 42 which is preferably formed of a resilient material such as rubber. This shield 42 is held in place by suitable means such as, for example, a pop rivet which comprises a metallic sleeve 43 that extends through coaxial bores in the shield 42 and the wall 40, and a stem 44 having at its upper end a ball-like head. When a pull is exerted on the stem 44 by means of a mandrel (not shown) the ball-like head on the upper end of the stem acts to flare outward the upper end of the sleeve 43 until this ball-like head becomes encased therein, as shown in FIGS. 2 and 3, it being understood that the lower end of the sleeve 43 is concurrently flared outward by the mandrel until the opposite ends of the sleeve 43 are flared as shown in FIGS. 2 and 3. Subsequent to the flaring of the opposite ends of the sleeve 43 in the manner just explained, the continued pull on the stem 44 by the mandrel causes this stem to break just below the ball-like head which thereafter maintains the sleeve 43 in the position shown in FIGS. 2 and 3. The circumferential surface of the shield 42 is adapted to engage the conical surface 41 for preventing access to the chamber 35 of particles of foreign matter or by nest building insects such as, for example, mud wasps. It will be noted that the surface 41 on the wall 40 extends somewhat beyond the rubber shield 42 so as to provide an adequate protection against the formation of ice over the opening in the frusto-conical cavity in the wall 40, and that the shield 42 has sufficient area and flexibility to insure its displacement under the pressure of fluid released from the brake cylinder device to eject any foreign matter that might reach it.

It will be understood that the usual brake control valve device provided on railway cars is operative in the usual manner in effecting a brake release to vent fluid under pressure from the brake cylinder device on the corresponding car by way of the brake cylinder exhaust pipe that has one end connected to the pipe bracket and the brake cylinder pressure retaining valve device 1 which is secured by cap screws extending through the bores 9 in the flange 7 to this pipe bracket.

Fluid under pressure thus vented from the brake cylinder device flows via a brake cylinder pipe (not shown) connecting the brake cylinder device to the corresponding brake control valve device, this brake control valve device which it may be assumed is in its release position, the brake cylinder exhaust pipe, the pipe bracket, counterbores 11 and 10 (FIG. 3) and strainer device 12 to the chamber 15. Assuming that the handle 19 of the brake cylinder pressure retaining valve device 1 is disposed in its first or direct exhaust position shown in FIGS. 1 and 3, it will be understood that the key 17 occupies the position shown in FIG. 3. In this position of the key 17 the flow of fluid under pressure from the brake cylinder device is unrestricted from the chamber 15 to atmosphere via passageway 16, bore 36, chamber 35, passageway 39 and thence past the rubber shield 42 which is deflected away from the conical surface 41 whenever the pressure in the chamber 35 exceeds atmospheric pressure. It will be apparent that, when fluid under pressure thus discharged from the brake cylinder device and chamber 15 is reduced to substantially atmospheric pressure, the shield 42 will return to the position shown in FIGS. 2 and 3 in which its outer peripheral portion lies in contact with the conical inner surface 41 on the wall 40.

From the foregoing it is apparent that, when a brake release is effected while the handle 19 occupies the direct exhaust position shown in FIGS. 1 and 3, no fluid under pressure is retained in the brake cylinder device.

If it is desired to release fluid under pressure from the brake cylinder device at a chosen slow rate until the pressure therein is reduced to a chosen pressure such as, for example, 20 pounds per square inch, and thereafter retain this pressure in the brake cylinder device while a recharge of the brake equipment is effected while a train is descending a long grade, prior to beginning the descent the train will be stopped and a trainman, assuming each car in the train to be provided with the brake cylinder pressure retaining valve device 1 shown in FIGS. 1 to 5, inclusive, will manually rotate the handle 19 of each valve device 1 clockwise from its first position shown in FIG. 1 to a second position in which the handle 19 is in alignment with and overlies the indicium HP on the lug 23, this second or high pressure position of the handle 19 being shown in broken lines in FIGS. 3 and 4 and denoted by the numeral 45.

As the handle 19 is rotated as described above, it is effective to rotate the key 17 therewith from its first position shown in FIG. 3 to its second position shown in FIG. 4 in which one end of the counterbore 37 opens into the passageway 16. Now when the brake control valve device is moved to its release position in response to an increase in pressure in the usual train brake pipe, fluid under pressure will flow from the brake cylinder device to the chamber 15 and passageway 16 (FIG. 4) in the manner hereinbefore described. Since the key 17 now occupies the position shown in FIG. 4, the fluid under pressure supplied to the passageway 16 flows to the right-hand side of the check valve 29 via the counterbore 37, bore 38 which constitutes a choke, bottom bore 26 (FIG. 2) and counterbore 27 and acts on the area of this valve within the annular valve seat 28 it being noted that both ends of the bore 36 (FIG. 4) are closed by the casing 2. When the pressure acting on the area of the valve 29 within the annular valve seat 28 formed on the key 17 has been increased to a chosen pressure such as, for example, 20 pounds per square inch, valve 29 will be moved in the direction of the left hand, as viewed in FIG. 2, away from the valve seat 28 against the yielding resistance of the spring 30.

Subsequent to the unseating of the valve 29 in the manner just explained, fluid under pressure supplied from the brake cylinder device to the interior of the bottom bore 26 and counterbore 27 will flow past the unseated valve 29 and thence to atmosphere via counterbore 33, passageway 33 (FIG. 2), chamber 35, passageway 39 (FIG. 3) and past the rubber shield 42 at a slow or restricted rate determined by the size of the bores or chokes 38 and 33 until the pressure in the brake cylinder device is reduced to the aforementioned 20 pounds per square inch at which time the spring 30 will move the valve 29 into seating contact with its seat 28 to prevent a further reduction in pressure in the brake cylinder device. Thus, a pressure of, for example, 20 pounds per square inch, is retained in each brake cylinder device to maintain the brakes applied while the brake equipment is released and recharged preparatory to effecting a second or successive brake application as a train descends a long grade in mountainous terrain.

If it is desired to provide a complete release of fluid under pressure from the brake cylinder devices on the cars in a train, but at a slow or restricted rate, when a recharge of the brake equipment is effected while a train is descending a long grade, prior to beginning the descent, the train will be stopped and a trainman will manually rotate the handle 19 clockwise (FIG. 1) from the position it occupies until the handle abuts the lug 24 bearing the indicium SD, this third position of the handle 19 being shown in broken lines in FIGS. 3 and 5 and indicated by the reference numeral 46.

As the handle 19 is rotated as described above, it is effective to rotate the key 17 therewith to its third position shown in FIG. 5 in which one end of the counterbore 37 is partly open into the passageway 16 and the passageway 36 is partly open into the chamber 35.

It is apparent that when the brake control valve device is moved to its release position in response to an increase in pressure in the train brake pipe, fluid under pressure will flow from the brake cylinder device to the chamber 15 and passageway 16 (FIG. 5) in the manner hereinbefore described. With the key 17 now occupying the position shown in FIG. 5, the fluid under pressure supplied to the passageway 16 will flow to atmosphere via counterbore 37, bore 38 which constitutes a choke, bore 36, chamber 35, passageway 39 (FIG. 3) and past the rubber shield 42 at a slow or restricted rate determined by the size of the bore or choke 38 until fluid under pressure has been completely depleted from the respective brake cylinder device or in other words until the pressure in each brake cylinder device has been reduced to atmospheric pressure.

FIGS. 6 to 10, inclusive, show a three-position brake cylinder pressure retaining valve device 47 that constitutes a second embodiment of the invention.

According to the second embodiment of the invention shown in FIGS. 6 to 10 inclusive, this three-position brake cylinder pressure retaining valve device 47 comprises a casing 48 which may be a die casting of aluminum. This casing 48 is provided with a tapered bore 49 which, as shown in FIG. 7, opens at its right-hand end into a straight smooth bore 50 and at its left-hand end into a screw-threaded bore 51 in which is received a screw-threaded plug 52.

As is apparent from FIGS. 6, 7 and 8, formed integrally with the aluminum casing 48 is a flange 53 which is identical in construction to the flange 7 shown in FIGS. 1 to 5, inclusive. Accordingly, like reference numerals have been used to designate the structure of the flange 53 and a strainer device shown in FIGS. 6, 7 and 8 which are identical with that shown in FIGS. 1 to 5, inclusive, and already described.

As shown in FIG. 8, the chamber 15 in the flange 53 is connected to the tapered bore 49 by a passageway 54 which corresponds to the passageway 16 in the first embodiment of the invention.

As shown in FIG. 7, a tapered bushing 55 constructed of, for example, brass and having the same inside and outside taper as the tapered bore 49 in the aluminum casing 48 is press-fitted into this bore 49, and a tapered plug or key 56 also constructed of, for example, brass is rotatably mounted in this bushing 55. The purpose of providing a brass bushing in an aluminum casing is to prevent sticking of the brass key in the aluminum casing which would occur as the result of galvanic corrosion between the brass key and the aluminum casing if the brass bushing 55 were not used. A spring 57 is interposed between the plug 52 and the left-hand end of the key 56 to bias this key 56 against the inside wall surface of the bushing 55 to insure that the key 56 is not moved by car vibration from any one of three positions to which it may be manually moved by a handle 58 having adjacent one end a substantially square counterbore into which fits a substantially square shank 59 formed on the right-hand end of the key 56. A screw 60 extending through a bore 61 in the handle 58 and having screw-threaded engagement with internal screw threads formed in a coaxial bottom bore in the shank 59 serves to secure the handle 58 to the shank 59.

As shown in FIG. 6 of the drawings, cast or stenciled on the handle 58 adjacent its upper end and arranged in arcuate spaced-apart relation are the indicia EX, HP and SD denoting corresponding exhaust, high pressure and slow direct positions of the key 56 accordingly as the handle 58 is rotated to positions in which one of these indicia is in alignment with a pointer or lug 61a formed integral with the casing 48.

As shown in FIG. 7, the tapered key 56 is provided adjacent the shank 59 with a peripheral annular groove in which is disposed an O-ring 62 that forms a seal with the wall surface of a straight bore 63 extending inward from the right-hand end of the bushing 55 to prevent leakage of fluid under pressure from the passageway 54 to atmosphere along the periphery of the key 56.

This key 56, as shown in FIG. 7, is provided with a screw-threaded bottom bore 64 which serves the same purpose as the screw-threaded bottom bore 26 in the first embodiment of the invention. The left-hand end of the bottom bore 64 opens into a coaxial counterbore 65 at the left-hand end of which is formed an annular valve seat 66 against which a flat disc-type check valve 67 is biased by a spring 68 interposed between this check valve 67 and a slotted cup-shaped spring seat 69 identical in construction to the spring seat 31 shown in FIG. 2 and hereinbefore described.

While the spring 68 biases the valve 67 against its seat 66 communication is closed between the counterbore 65 and a drilled passageway 70 of small diameter constituting a choke provided in the key 56. One end of this passageway 70 opens into a second counterbore 71 coaxial with the counterbore 65 and the opposite end opens at the peripheral surface of the key 56 at such a location as to be in alignment with the right-hand end a bore 72 extending through the bushing 55 while the key 56 occupies its high pressure position shown in FIG. 9.

The key 56 is further provided with a bore or port 73 of large diameter, the axis of this bore being at a right angle to and slightly offset from the axis of the above-mentioned screw-threaded bottom bore 64 whereby fluid under pressure may flow from the chamber 15 to the right-hand side of the check valve 67 via passageway 54, bores or ports 72, 73 and 64 and counterbore 65 to effect unseating of this valve in a manner hereinafter described.

In order to provide for a slow direct complete blowdown of fluid under pressure from the brake cylinder device, while the handle 58 is in its slow direct position in which the key 56 occupies the position shown in FIG. 10, this key is provided with a bore 74 of small diameter so that this bore constitutes a choke, and a coaxial counterbore 75 the axes of which intersects the axes of the bore 73. One end of the bore 74 opens into one end of the counterbore 75 and the opposite end of this counterbore 75 opens into a concave recess 76 formed as by a milling operation in the peripheral surface of the key 56 intermediate the ends thereof.

As best shown in FIG. 8 of the drawings, the right-hand end of the bore 72 opens into a chamber 77 formed in the casing 48 which chamber 77 is open to atmosphere via a conical-shaped passageway 78 that extends through a wall 79 that has formed on its right-hand side a conical inner surface 80 at the right-hand end of which is an inturned flange 81. Resting against this conical inner surface 80 is a dished circular shield 82 which is preferably formed of a resilient material such as rubber and has at its center a conical boss 82a that extends into a conical recess formed in the wall 79. This shield 82 is held in place by snap ring 83 of special design in that it comprises an annular wire ring that rests against the inturned flange 81 and a finger bowed at its center so as to abut the conical boss 82a and secured as by, for example, brazing or soldering at its opposite ends to the wire ring. The conical circumferential surface of the shield 82 is adapted to engage the conical surface 80 for preventing access to the chamber 77 of particles of foreign matter or nest building insects. The surface 80 extends somewhat beyond the shield 82 so as to insure an adequate protection against the formation of ice over the opening in the frustoconical cavity in the wall 79. Furthermore, the resilient shield 82 has sufficient area and flexibility to insure its displacement under the pressure of fluid released from the brake cylinder device to eject any foreign matter that might reach it.

As in the first embodiment of the invention, fluid under pressure vented from the brake cylinder device flows to the chamber 15 via the path hereinbefore described. Assuming that the handle 58 of the brake cylinder pressure retaining valve device 47 is disposed in it first or direct exhaust position shown in FIGS. 6 and 8, it will be understood that the key 56 occupies the position shown in FIG. 8. In this position of the key 56 the flow of fluid under pressure from the brake cylinder device is unrestricted from the chamber 15 to atmosphere via passageway 54. bores 72 and 73, chamber 77, passageway 78 and thence past the shield 82 which is deflected away from the conical surface 80 as in the first embodiment of the invention.

From the foregoing it is apparent that, when a brake release is effected while the handle 58 occupies its direct exhaust position shown in FIGS. 6 and 8, no fluid under pressure is retained in the brake cylinder device.

If it is desired to release fluid under pressure from the brake cylinder device at a chosen slow rate until the pressure therein is reduced to a chosen pressure such as, for example, 20 pounds per square inch, and thereafter retain this pressure in the brake cylinder device when a recharge of the brake equipment is effected while a train is descending a grade, the train will be stopped prior to beginning the descent and a trainman will manually rotate the handle 58 of each brake cylinder pressure retaining valve 47 clockwise (FIG. 6) from the position shown in FIG. 6 to a second position in which the indicium HP on the handle 58 is in alignment with the pointer 61a.

As the handle 58 is rotated as described above, it is effective to rotate the key 56 therewith to the position shown in FIG. 9 in which the recess 76 partly registers with the left-hand end of the bore 72 in the bushing 55. Fluid under pressure will now flow from the brake cylinder device to the chamber 15 in the manner hereinbefore described and thence to the right-hand side of the check valve 67 via passageway 54, bore 72, recess 76, counterbore 75, bores 73 and 64, and counterbore 65. When the pressure acting on the area of the valve 67 within annular valve seat 66 has increased sufficiently to overcome the yielding resistance of the spring 68 which may be of such strength as to require a pressure of, for example, 20 pounds per square inch, this valve 67 will be moved in the direction of the left hand away from its seat 66.

Subsequent to unseating of valve 67, fluid under pressure supplied from the brake cylinder device to the interior of the counterbore 65 will flow past the unseated valve 67 and thence to atmosphere via counterbore 71, restricted passageway 70, one end of which opens at the peripheral surface of the key 56 within the right-hand end of the bore 72 in the bushing 55 while the key 56 occupies the position shown in FIG. 9, the right-hand end of bore 72, chamber 77, passageway 78 and past the shield 82 at a slow or restricted rate determined by the size of the restricted passageway 70 until the pressure in the brake cylinder device is reduced to the aforesaid 20 pounds per square inch at which time the spring 68 seats valve 67 on its seat 66 to prevent a further reduction in pressure in the brake cylinder device. Thus, a pressure of, for example, 20 pounds per square inch, is retained in each brake cylinder device to maintain the brakes applied while the brake equipment is recharged preparatory to effecting a second brake application as the train descends a long grade.

If it is desired to effect a complete release of fluid under pressure from the brake cylinder devices on the cars in a train at a slow rate while recharging the brake equipment as the train descends a grade, prior to beginning the descent the train will be stopped and a trainman will manually rotate the handle 58 of the retaining valve device 47 on each car clockwise (FIG. 6) from the position it occupies until the indicium SD on the handle is in alignment with the pointer 61a.

This rotation of the handle 58 is effective to rotate the key 56 therewith to its third or slow direct position shown in FIG. 10.

Fluid under pressure supplied from the brake cylinder device to the chamber 15 in the manner hereinbefore described will now flow to atmosphere via passageway 54, bore 72, recess 76, counterbore 75, bore 74 which constitutes a choke, chamber 77, passageway 78 and past shield 82 at a slow rate determined by the size of the choke 74 until fluid under pressure has been completely released from each respective brake cylinder device.

FIG. 11 shows a three-position brake cylinder pressure retaining valve device 84 that constitutes a third embodiment of the invention.

According to the third embodiment of the invention, the three-position brake cylinder pressure retaining valve device 84 is substantially the same in construction as the retaining valve device 47 except a casing 85 which may also be a die casting of aluminum does not require a bushing corresponding to the bushing 55 for the reason that this die cast aluminum casing 85 is provided with a tapered bore 86 in which is rotatably mounted a correspondingly tapered key 87 constructed of a plastic material such as, for example, polyethylene.

As is apparent from FIG. 11, formed integral with the aluminum casing 85 is a flange and strainer device identical in construction to the flanges 7 and 53 shown in the previous embodiments of the invention. Accordingly, like reference numerals have been used to designate these structures shown in FIG. 11.

The chamber 15 is connected to the tapered bore 86 by a passageway 88 which corresponds to the passageways 16 and 54 in the previous embodiments of the invention.

The key 87 is provided with a bore or port 89 of large diameter, which, as shown in FIG. 11, opens at its left-hand end into the passageway 88 and at its right-hand end at the surface of a narrow slot or recess 90 formed as by a milling operation in the peripheral surface of the key 87.

The wall surface of the bore 86 in the casing 85 is provided with an elliptical groove in which is disposed a resilient gasket 91 that surrounds the left-hand end of a passageway 92 formed in the casing 85. The right-hand end of this passageway 92 opens at a conical inner surface 93 against which rests a dished circular shield identical to the shield 82 shown in FIG. 8 and retained in place by an identical snap ring. Accordingly, this shield and snap ring shown in FIG. 11 are denoted by the same numerals as those shown in FIG. 8.

In order to provide for a slow direct complete blowdown of fluid under pressure from the brake cylinder device, while a handle 94, secured to the key 87 in the same manner as the handle 58 is secured to the key 56 in the second embodiment of the invention, is in its slow blow direct position, this key 87 is provided with a bore or port 95 having the same diameter as the bore 74 in the key 56, one end of this bore 95 opening at the peripheral surface of the key 87 and the opposite end opening into the bore 89 therein.

Except as noted above, it will be understood that the casing 85 and the key 87 are identical in construction to the casing 48 and key 56 of the brake cylinder pressure retaining valve device 47 constituting the second embodiment of the invention.

Assuming that the handle 94 and the key 87 shown in FIG. 11 are disposed in the direct exhaust position, it will be apparent that fluid under pressure vented from the brake cylinder device flows to the chamber 15 and thence unrestricted to atmosphere via passageway 88, bore 89, passageway 92, and thence past the shield 82 as in the previous embodiments of the invention until no fluid under pressure remains in the brake cylinder device.

If it is desired to release fluid under pressure from the brake cylinder device at a chosen slow rate until the pressure therein is reduced to a chosen pressure such as, for example, 20 pounds per square inch and thereafter retain this pressure in the brake cylinder device when a recharge of the brake equipment is effected while descending a grade, the key 87 will be rotated, by the handle 94 counterclockwise, as viewed in FIG. 11, in the manner described for the previous embodiments of the invention from its direct release position shown in FIG. 11 to its high pressure position in which the right-hand end of the recess 90 on the key 87 is disposed above the gasket 91 which forms a seal with the peripheral surface of the key 87 thereby preventing flow from the bore 89 to the passageway 92 and thence to atmosphere past the shield 82.

In this position of the key 87, the end of the bore 89 opposite the recess 90 is partly open to the passageway 88. Therefore, fluid under pressure will now flow from the brake cylinder device to the chamber 15 and thence to the right-hand side of a check valve carried by the key 87 and corresponding to the check valve 67 shown in FIG. 7 via the passageway 88, bore 89, and a bore and a counterbore in the key 87 corresponding to the bore 64 and counterbore 65 shown in FIG. 7. When the pressure acting on the area of this check valve within an annular valve seat that corresponds to the seat 66 (FIG. 7) has increased sufficiently to overcome the yielding resistance of a spring corresponding to the spring 68, this valve will be unseated whereupon fluid under pressure from the brake cylinder device will flow to atmosphere via a restricted passageway (not shown) in the key 87 corresponding to the restricted passageway 70 in the key 56 and opening at one end into the passageway 92, this passageway 92 and past the shield 82 at a restricted rate until the pressure in the brake cylinder device is reduced to the aforesaid 20 pounds per square inch at which time the check valve will be seated by the spring to prevent a further reduction in the pressure in the brake cylinder device. Thus, as in the previous embodiments of the invention, a chosen pressure is retained in each brake cylinder device while the brake equipment is recharged preparatory to effecting a second or successive brake application as the train descends a grade.

Let it be supposed that a complete direct release of fluid under pressure at a slow rate from the brake cylinder devices on the cars in a train is desired while recharging the brake equipment as the train descends a grade. Accordingly, prior to the descent the train will be stopped and a trainman will manually rotate the handle 94 of each retaining valve device 84 on the cars in the train, counterclockwise as viewed in FIG. 11, to its slow direct position to thereby effect rotation of the corresponding key 87 to a position in which the left-hand end of the recess 90 is open to the passageway 88 and that end of the bore 95 opening at the peripheral surface of the key 87 is within the gasket 91 and open to the passageway 92.

Fluid under pressure supplied from the brake cylinder device to the chamber 15 will now flow to atmosphere via passageway 88, recess 90, bores 89 and 95, passageway 92 and past shield 82 at a slow rate determined by the size of the bore 95 until fluid under pressure has been completely released from each respective brake cylinder device.

A brake cylinder pressure retaining valve device 96 constituting a fourth embodiment of the present invention is shown in FIGS. 12 and 13 of the drawings. This valve device 96 comprises a cylindrical casing 97 that, as viewed in FIG. 13, has formed integral therewith at its left-hand end a flange 98 provided with three spaced-apart screw-threaded bores 99 (FIG. 12) for receiving the screw threads on three cap screws (not shown) by which the retaining valve device 96 is secured to a pipe bracket (not shown) which is secured to the body of a railway car.

As shown in FIG. 13, the casing 97 is provided with a bore 100 and three coaxial counterbores 101, 102 and 103. The left-hand end of the bore 100 opens at a flanged fitting face 104 on the flange 98 which face 104 abuts a corresponding face on the pipe bracket which is secured to the body of the railway car by any suitable means.

As in the previous embodiments of the invention, the one end of the brake cylinder exhaust pipe is disposed in a bore in the pipe bracket which bore is coaxial with the bore 100 in the casing 97, and a strainer device 105 of any suitable construction is disposed in the counterbore 102 and retained therein by an annular plate 106 disposed in the counterbore 103.

Also disposed in the counterbore 103 is a bushing 107 comprising two complementary parts 107a and 107b separated by an elliptical seal member 108. This seal member 108 and the complementary parts 107a and 107b of the bushing 107 are retained in the counterbore 103 by a snap ring 109 which is inserted in a groove formed in the wall of this counterbore. This snap ring 109 is constructed of a piece of wire which is bent to form substantially a circle corresponding in diameter to the diameter of the groove in the wall of the counterbore 103 after which the ends of the wire are bent outward so as to lie in parallel side-by-side relation in a slot 110 formed in the casing 97. The part 107b of the two-part bushing 107 is provided with a peripheral annular groove in which is disposed a first O-ring 111 that forms a seal with the wall surface of the counterbore 103. The part 107b of bushing 107 is also provided with a bore 112 and a coaxial counterbore 113.

A cylindrical plug or key 114 is rotatably mounted in the bore 112 and has formed integral therewith a cylindrical member 115 which is rotatably mounted in the counterbore 113 in the two-part bushing 107.

The right-hand end of the key 114 is provided with a screw-threaded shank 116 in which is formed, as by a milling operation, a slot or groove 117 in which is received a tongue 118 that is integral with a handle 119 and extends into an opening 120 formed in this handle which is retained on the shank 116 by a nut 121 that has screw-threaded engagement with the screw threads on this shank.

Intermediate the shank 116 and the cylindrical member 115, the key 114 is provided with a peripheral annular groove in which is disposed an O-ring 114a that forms a seal with the wall surface of the bore 112 to prevent leakage of fluid under pressure from the interior of the counterbore 113 to atmosphere along periphery of the key 114.

As shown in FIG. 13, the key 114 is provided with a bottomed bore 122, and the cylindrical member 115, which is integral with the key 114, is provided with four counterbores 123, 124, 125 and 126 which are coaxial with the bottomed bore 122.

Slidably mounted in the counterbore 123 is a cup-shaped check valve 127 which is normally biased against an O-ring 128 disposed in the counterbore 124 by a spring 129 interposed between the check valve 127 and the end of the bottomed bore 122. The O-ring 128 constitutes an annular valve seat for the check valve 127 and is retained in the counterbore 124 by an annular member 130 disposed in the counterbore 125 and biased against the right-hand end thereof by a spring 131 interposed between this annular member 130 and the annular plate 106.

While the spring 129 biases the check valve 127 against its seat 128, communication is closed between the counterbore 125 and a drilled passageway 132 of small diameter constituting a choke provided in the cylindrical member 115. One end of this passageway 132 opens into the counterbore 123 and the opposite end opens at the peripheral surface of the cylindrical member 115 at such a location as to be in alignment with one end of an elongated slot 133 provided in the part 107b of the two-part bushing 107 while the key 114 and cylindrical member 115 occupy their high pressure position (not shown), the passageway 132 being shown in a broken away position in FIG. 13 to illustrate this communication.

As in the previous embodiments of the invention, in order to provide for a slow direct complete blowdown of fluid under pressure from the brake cylinder device, while the handle 119 is in its slow direct position, the cylindrical member 115 is provided with a bore or port 134 having the same diameter as the bores 74 (FIG. 10) and 95 (FIG. 11) so that this bore constitutes a choke, and a coaxial counterbore 135 the axis of which intersects and forms a right angle with the axis of the cylindrical member 115, it being noted that, while the key 114 and cylindrical member 115 occupy their direct release position in which they are shown in FIG. 13, the end of the bore 134 opening at the peripheral surface of the cylindrical member 115 is disposed on the left-hand side of the seal member 108.

As shown in FIG. 13, the elongated slot 133 in the part 107b of the two-part bushing 107 is in constant communication with one end of a passageway 136 provided in the casing 97 and having its opposite end opening into a cylindrical chamber 137 formed by the cooperative relation of the casing 97 and a dished circular shield 138 which is preferably formed of a resilient material such as, for example, rubber. This shield 138 is held in place by a pin 139 pressed into a bore 140 provided in the casing 97, this pin having two spaced-apart collars between which the shield is disposed. The circumferential surface of the shield 138 is adapted to contact the casing 97 about the lower end of the cylindrical chamber 137 therein to prevent access to this chamber of particles of foreign matter or by nest building insects, such as, for example, mud wasps.

Assuming that the handle 119 of the brake cylinder pressure retaining valve device 97 is disposed in its first or direct exhaust position in which it is shown in FIGS. 12 and 13, it will be understood that the key 114 and cylindrical member 115 occupy the position in which they are shown in FIG. 13. In this position of the key 114 and cylindrical member 115 the flow of fluid under pressure from the brake cylinder device to atmosphere is unrestricted via the brake cylinder pipe, the brake control valve device which it may be assumed is in its release position, the brake cylinder exhaust pipe, the pipe bracket, bore 100 (FIG. 13), counterbore 101, strainer device 105, annular plate 106, counterbores 113, 125, 126 and 135, elongated slot 133, passageway 136, chamber 137 and thence past the rubber shield 138 which is deflected away from the casing 97 whenever the pressure in the chamber 137 exceeds atmospheric pressure. It will be apparent that, when the fluid under pressure thus discharged from the brake cylinder device and chamber 137 is reduced to substantially atmospheric pressure, the shield 138 will return to the position shown in FIG. 13.

From the foregoing it is apparent that, when a brake release is effected while the handle 119 occupies its direct exhaust position shown in FIGS. 12 and 13, no fluid under pressure is retained in the brake cylinder device.

If it is desired to release fluid under pressure from the brake cylinder device at a slow rate until the pressure therein is reduced to a chosen pressure such as, for example, 20 pounds per square inch, and thereafter retain this pressure in the brake cylinder device when a recharge of the brake equipment is effected while the train is descending a grade, a trainman, in the manner hereinbefore described for the previous embodiments of the invention, will manually rotate the handle 119 of each retaining valve device 96 from its first position shown in FIG. 12 in a clockwise direction, as viewed in FIG. 12, through an angle of 60° to a second position, this second or high pressure position of the handle 119 being shown in broken lines in FIG. 12 and denoted by the numeral 141.

As the handle 119 is rotated as described above, it is effective to rotate the key 114 and cylindrical member 115 therewith from their first position in which they are shown in FIG. 13 to their second position (not shown).

In this second position of the key 114 and cylindrical member 115, that end of the bore 134 opening at the peripheral surface of the cylindrical member 115 is disposed at the left-hand side of the seal member 108 as is the case in the first position of the key 114 shown in FIG. 13. Therefore, no fluid under pressure can flow through the bore 134 to atmosphere along the periphery of the cylindrical member 115, the elongated slot 133, passageway 136, chamber 137 and past shield 138.

Now when the corresponding brake control valve device is moved to its release position in response to an increase in pressure in the usual train brake pipe, fluid under pressure will flow from the brake cylinder device to the interior of the counterbore 125 via the pathway hereinbefore described and thence to the left-hand side of the check valve 127 via the annular member 130. This fluid under pressure acts on the area of this check valve 127 within the O-ring 128 which is the valve seat for this valve, it being noted that in this position of the cylindrical member 115 the lower end of the counterbore 135, as viewed in FIG. 13, is no longer in alignment with the elongated slot 133. When the pressure acting on the area of the check valve 127 within the O-ring 128 has been increased sufficiently to overcome the yielding resistance of the spring 129 which may be of such strength as to require a pressure of, for example, 20 pounds per square inch, this valve 127 will be moved in the direction of the right hand away from its seat.

Subsequent to unseating of the valve 127, fluid under pressure supplied from the brake cylinder device to the interior of the counterbore 125 via the pathway hereinbefore described, will flow past the unseated valve 127 and thence to atmosphere via counterbore 123, restricted passageway 132 one end of which in this position of the cylindrical member 115 and key 114 opens at the peripheral surface of the member 115 within the elongated slot 133, this slot 133, passageway 136, chamber 137 and past the shield 138 at a slow or restricted rate determined by the size of the restricted passageway 132 until the pressure in the brake cylinder device is reduced to the aforesaid 20 pounds per square inch at which time the spring 129 seats the valve 127 on its seat 128 to prevent a further reduction in pressure in the brake cylinder device. Thus, a chosen pressure of, for example, 20 pounds per square inch, is retained in each brake cylinder device to maintain the brakes applied while the brake equipment is recharged as the train descends a grade.

Let it be supposed that it is desired to effect a complete release of fluid under pressure from the brake cylinders on the cars in the train at a slow rate while recharging the brake equipment as the train descends a grade. In this case, the train will be stopped prior to beginning the descent and a trainman will manually rotate the handle 119 of each retaining valve device 96 clockwise, as viewed in FIG. 12, from the position it occupies in FIG. 12 through an angle of 135° to a third or slow direct position which is shown in broken lines in FIG. 12 and denoted by the numeral 142.

As the handle 119 is thus rotated as just described, it is effective to rotate the key 114 and cylindrical member 115 therewith from their first position in which they are shown in FIG. 13 to their third position (not shown). This rotation of the cylindrical member 115 through an angle of 135° is sufficient to shift that end of the bore 134 opening at the peripheral surface of the member 115 from a position in which it is disposed at the left-hand side of the seal member 108, as shown in FIG. 12, to a position in which it is disposed at the right-hand side of the seal member 108 and in alignment with the elongated slot 133.

Fluid under pressure supplied from the brake cylinder device to the interior of the bore 125 in the manner hereinbefore described will now flow to atmosphere via counterbore 135, bore 134 which constitutes a choke, elongated slot 133, passageway 136, chamber 137 and past shield 138 at a slow rate determined by the size of the choke 134 until fluid under pressure has been completely released from each respective brake cylinder device as in the previous embodiments of the invention.

I claim:

1. A brake cylinder pressure retaining valve device comprising a casing having a bore, an inlet port in communication with said bore via which fluid under pressure from the brake cylinder is admitted to said bore, and an outlet port via which fluid under pressure is released to atmosphere, wherein the improvement comprises:
   a. a cock key conforming to said bore and rotatable therein, said key having a longitudinal stepped bore therein, a plurality of transverse ports intersecting said stepped bore, and an annular valve seat between two coaxially adjacent portions of said longitudinal stepped bore;
   b. a check valve biased into seated relation on said annular valve seat; and
   c. said cock key having one position in which said inlet port communicates with said outlet port via one of said transverse ports in said cock key to release fluid under pressure to atmosphere at a rapid unrestricted rate, and being rotatable out of said one position to a first different position in which said inlet port communicates with said outlet port via another of said transverse ports, a portion of said longitudinal bore, and past said check valve to release fluid under pressure to atmosphere at a restricted rate down to a chosen low pressure determined by the biasing force seating said check valve, and being rotatable out of said first different position to a second different position in which said inlet port communicates with said outlet port via said one and said other transverse ports to release fluid under pressure to atmosphere at a restricted rate.

2. A brake cylinder pressure retaining valve device, as claimed in claim 1, wherein said one position and said second different position of said cock key are located at the opposite extremities of rotative movement of said cock key and said first different position is located intermediate said one and said second different positions of said cock key.

3. A brake cylinder pressure retaining valve device, as claimed in claim 1, further characterized in that the axis of said inlet port and that of said bore in said casing are substantially at a right angle to each other, and in that the axis of said outlet port and the axis of said bore in the casing are at substantially a right angle to each other.

4. A brake cylinder pressure retaining valve device, as claimed in claim 1, further characterized in that said casing is provided with a securing flange having a face at which said inlet port opens and through which said inlet port extends, and in that a fluid strainer device is disposed in said inlet port for removing contaminants from fluid under pressure flowing therethrough.

5. A brake cylinder pressure retaining valve device, as claimed in claim 4, further characterized in that a counterbore extends inwardly from said face of said securing flange in surrounding relation to said inlet port, and in that a seal member is disposed in said counterbore.

6. A brake cylinder pressure retaining valve device, as claimed in claim 1, further characterized in that said casing is provided with a groove disposed in surrounding relation to said outlet port, and in that a seal member is disposed in said groove to form a seal with the peripheral surface of said cock key while it occupies certain of its plurality of positions.

7. A brake cylinder pressure retaining valve device, as claimed in claim 6, further characterized in that said groove and said seal member are elliptical in shape.

8. A brake cylinder pressure retaining valve device, as claimed in claim 1, wherein said bore in said casing and said cock key are tapered, a removable plug closes the larger end of said tapered bore, and a helical spring is interposed under compression between the larger end of said tapered cock key and said plug to bias said cock key in one direction against the wall surface of said tapered bore, further characterized by:
   a. a removable spring seat means carried by said cock key and extending coaxially within said helical spring; and
   b. spring means interposed between said check valve and said spring seat for biasing said check valve into seated position on said annular valve seat.

9. A brake cylinder pressure retaining valve device, as claimed in claim 1, further characterized in that:
   a. said inlet port is coaxial to said bore in said casing and to said stepped bore in said cock key; and
   b. said casing is provided with a securing flange having a face at which said inlet port opens.

10. A brake cylinder pressure retaining valve device, as claimed in claim 9, further characterized by:
    a. a bushing in the casing bore having two coaxially related complementary parts, the adjacent ends of which lie in parallel spaced apart planes at an angle to the axis of said bushing;
    b. a seal member of elliptical shape disposed in the space between the adjacent ends of said complementary parts of said bushing; and
    c. said cock key being rotatably mounted in said bushing, whereby one of the transverse ports in said cock key opens exteriorly of said cock key at one side of said seal member in said one and said first different positions of said cock key and at the opposite side of said seal member in the said second different position of said cock key whereby said seal member prevents flow of fluid under pressure to atmosphere via said one of the transverse ports in said one and said first different positions of said cock key and provides for a restricted rate of flow of fluid under pressure to atmosphere via said one of the transverse ports in said second different position of said cock key.

11. A brake cylinder pressure retaining valve device, as claimed in claim 1, further characterized in that:
   a. said inlet port is coaxial to said bore in said casing and to said stepped bore in said cock key;
   b. said casing is provided with a securing flange having a face at which said inlet port opens, and a counterbore coaxial with said bore therein;
   c. a fluid strainer device is disposed in said counterbore for removing contaminants from fluid under pressure flowing from said inlet port through said counterbore; and
   d. a spring means having one end seated against said strainer device biases said strainer device and said cock key respectively in opposite directions.

12. A brake cylinder pressure retaining valve device comprising a casing having a bore, an inlet port in communication with said bore via which fluid under pressure from the brake cylinder is admitted to said bore, an outlet port via which fluid under pressure is released to atmosphere, and a cock key conforming to and rotatably mounted in said bore and controlling communication between the inlet and outlet ports, wherein the improvement comprises:
   a. the arrangement of said inlet port in coaxial relationship to said bore in said casing; and
   b. a securing flange on said casing parallel to a plane perpendicular to the axis of said bore and having a face at which said inlet port opens.

13. A brake cylinder pressure retaining valve device comprising a casing having a bore, an inlet port in communication with said bore via which fluid under pressure from the brake cylinder is admitted to said bore, and an outlet port via which fluid under pressure is released to atmosphere, wherein the improvement comprises:
   a. a cock key conforming to said bore and rotatable therein, said key having a longitudinal stepped bore therein, a plurality of transverse ports intersecting said stepped bore, and an annular valve seat between two coaxially adjacent portions of said longitudinal stepped bore;
   b. a check valve biased into seated relation on said annular valve seat; and
   c. said cock key having one position in which said inlet port communicates with said outlet port via one of said transverse ports in said cock key to release fluid under pressure to atmosphere at a rapid unrestricted rate, and being rotatable out of said one position to a different position in which said inlet port communicates with said outlet port via said longitudinal bore, past said check valve, and another of said transverse ports to release fluid under pressure to atmosphere at a restricted rate down to a chosen low pressure determined by the biasing force seating said check valve.